United States Patent [19]
Graves, Jr. et al.

[11] Patent Number: 5,329,826
[45] Date of Patent: Jul. 19, 1994

[54] ENHANCED AUTOMATED SPLITTER SHIFTING WITH DUAL SOLENOID VALVES AND AUTO FUEL CONTROL

[75] Inventors: Roger A. Graves, Jr., Battle Creek; William J. Mack, Clarkston, both of Mich.

[73] Assignee: Eaton Corporation, Cleveland, Ohio

[21] Appl. No.: 823,743

[22] Filed: Jan. 22, 1992

[51] Int. Cl.⁵ .............................................. F16H 59/00
[52] U.S. Cl. ................................... 74/335; 74/336 R; 477/124
[58] Field of Search ...................... 74/335, 336 R, 745, 74/866; 364/424.1

[56] References Cited

U.S. PATENT DOCUMENTS

| | | | |
|---|---|---|---|
| 3,478,851 | 11/1969 | Smyth et al. | 142/3.55 |
| 4,324,322 | 4/1982 | Sibeud | 74/866 X |
| 4,361,060 | 11/1982 | Smyth | 74/752 |
| 4,595,986 | 4/1986 | Dupenspeck et al. | 364/424.1 |
| 4,722,248 | 2/1988 | Braun | 74/866 |
| 4,853,629 | 8/1989 | Rops | 324/208 |
| 4,964,313 | 10/1990 | Davis | 74/331 |
| 5,050,451 | 9/1991 | Hussain | 74/844 |
| 5,199,311 | 4/1993 | Muyskens et al. | 74/335 |
| 5,199,312 | 4/1993 | Haggins et al. | 74/335 |
| 5,218,878 | 6/1993 | Monette et al. | 74/335 |

FOREIGN PATENT DOCUMENTS

| | | |
|---|---|---|
| 427000 | 10/1990 | European Pat. Off. |
| 3045840 | 7/1982 | Fed. Rep. of Germany |
| 2154235 | 5/1973 | France |

*Primary Examiner*—Leslie A. Braun
*Assistant Examiner*—Khoi Ta
*Attorney, Agent, or Firm*—Howard D. Gordon

[57] ABSTRACT

A pneumatic control system (200) for controlling the automated shifting of the splitter section (114) of an automated compound transmission (110) is provided. Shifting of the splitter section is controlled by a differential area piston/cylinder actuator assembly (162) having a first chamber (168A) associated with low-speed operation and a second chamber (170A) associated with high-speed operation. Pressurization and exhaust of each of the chambers is controlled by an individual independently controlled solenoid actuated valve (202 and 204 respectively), each of which operates in response to control signals from an ECU 124.

20 Claims, 3 Drawing Sheets

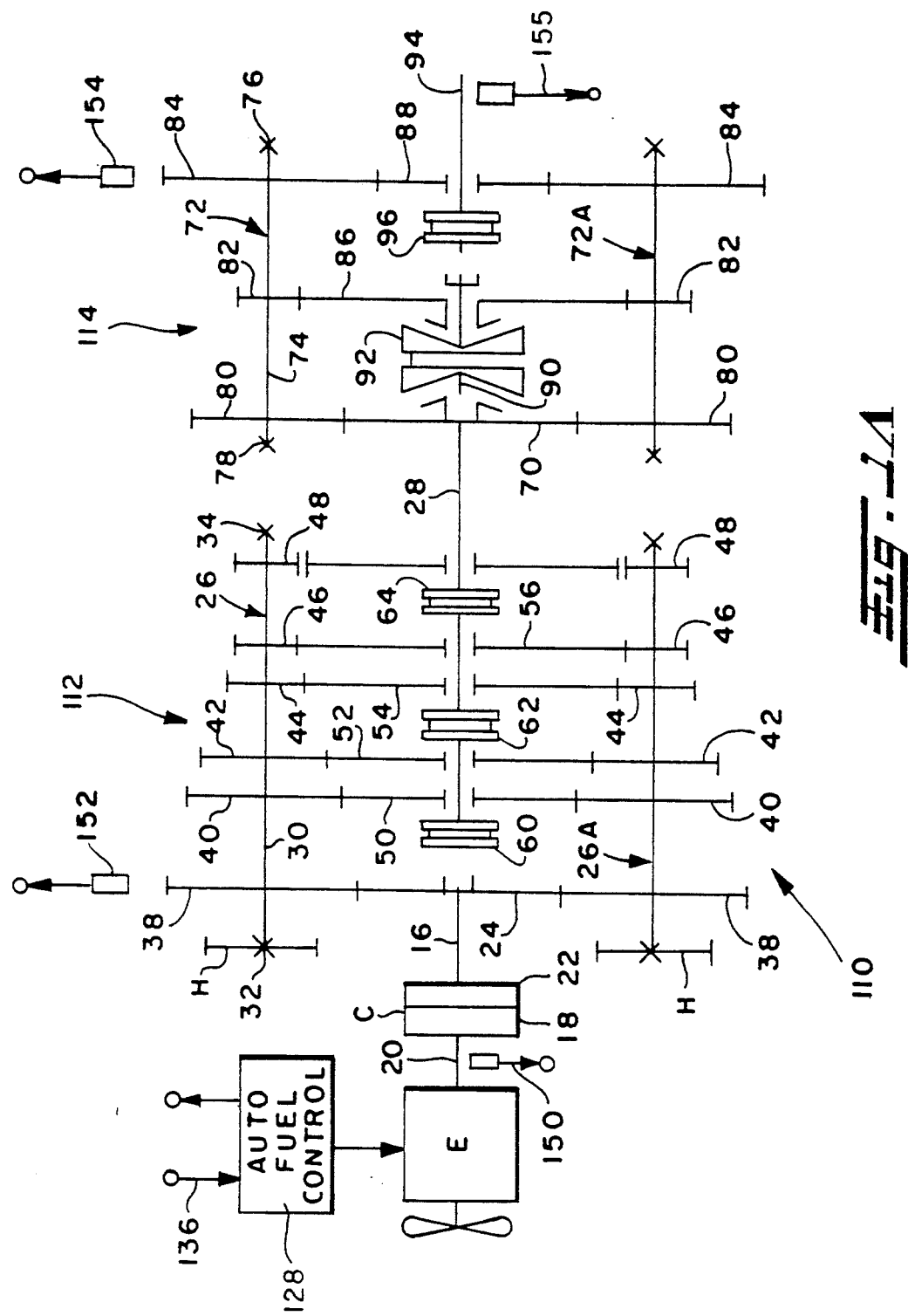

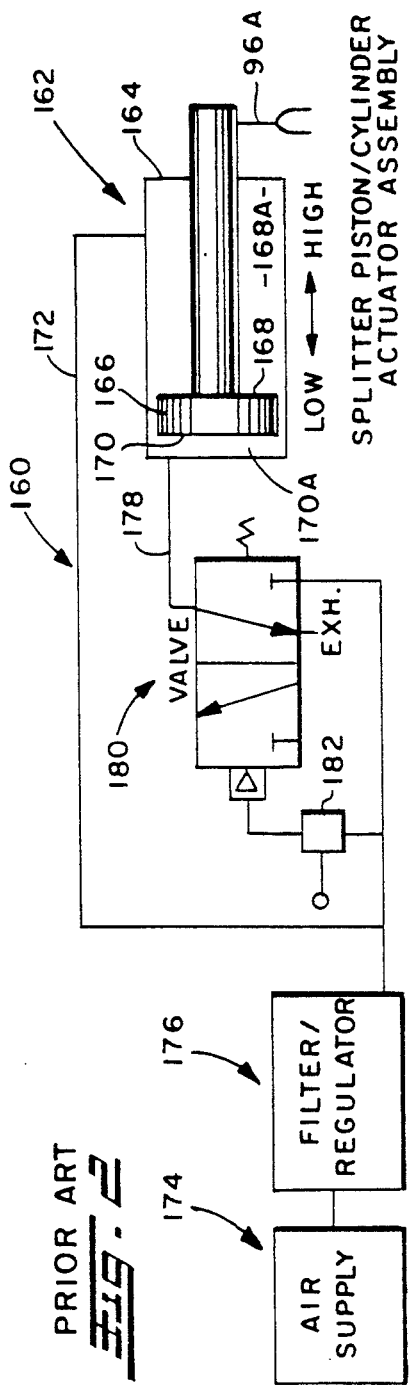

ENHANCED AUTOMATED SPLITTER SHIFTING WITH DUAL SOLENOID VALVES AND AUTO FUEL CONTROL

BACKGROUND OF THE INVENTION

1. Field of the Invention

The present invention relates to a control system or method for controlling the auxiliary section splitter actuator of an automated or partially automated vehicular compound transmission. In particular, the present invention relates to a control system or method for controlling the splitter section actuator of an automated or partially automated compound vehicular transmission wherein a two-position fluid actuated actuator is utilized to engage and disengage non-synchronized jaw clutches to selectively engage either a low-speed or a high-speed splitter section ratio.

2. Description of the Prior Art

Compound change gear transmissions of the type having one or more auxiliary sections connected in series with a main transmission section are very well known in the prior art. Such transmissions are typically associated with heavy duty vehicles such as large trucks, tractor/semi-trailers, and the like. Auxiliary transmission sections are of three general types; range type, splitter type, or combined range/splitter type.

In compound transmissions having a splitter type auxiliary section, the ratio steps of the splitter auxiliary section are less than the ratio steps of the main transmission section and each main transmission section ratio may be split, or subdivided, by the splitter section. Examples of compound change gear transmissions having splitter type auxiliary sections may be seen by reference to U.S. Pat. Nos. 4,290,515; 3,799,002; and 4,527,447, the disclosures of which are hereby incorporated by reference.

In a combined range and splitter type auxiliary section, or sections, both range and splitter type ratios are provided allowing the main transmission to be progressively shifted through its ratios in at least two ranges and also allowing the main transmission section ratios to be split in at least one range. Examples of compound transmissions having a single combined range/splitter type auxiliary section may be seen by reference to U.S. Pat. Nos. 3,283,613; 3,648,546 and 4,754,665; the disclosures of which are hereby incorporated by reference. Assignees well known RT/RTO 11613 and RT/RTO 14718 "Eaton Roadranger" transmissions are examples of combined range/splitter type transmissions.

Another example is the "Ecosplit" model of transmission sold by Zahnradfabrik Friedrichshafen Aktiengeseushaft of Friedrichshafen, Germany which is a sixteen forward speed type of transmission which utilizes a separate two-speed splitter auxiliary section in front of and a separate two-speed range section behind the main transmission section.

It should be noted that the terms main and auxiliary sections are relative and that the designations of the main and auxiliary sections are reversed, the type of auxiliary section (either range or splitter) will also be reversed. In other words, given what is conventionally considered to be a four speed main section with a two-speed range type auxiliary section, if the normally designated auxiliary is considered the main section, then the normally designated main section would be considered a four speed splitter type auxiliary section therefor. By generally accepted transmission industry convention, and as used in this description of the invention, the main transmission section of a compound transmission is that section which contains the largest (or at least no less) number of forward speed ratios, which allow selection of a neutral position, which contains the reverse ratio(s) and/or which is shifted (in manual or semi-automatic transmissions) by manipulation of the shift bar or shift rail or shift shaft/shift finger assembly as opposed to master/slave valve/cylinder arrangements or the like.

Splitter shift control systems and methods for controlling the fully or partially automated shifting of splitter section nonsynchronized jaw clutches in automated or partially automated compound transmissions are known in the prior art. An example of such a partially automated transmission system may be seen by reference to U.S. Pat. No. 4,722,248, the disclosure of which is hereby incorporated by reference. Such prior art automated or partially automated transmissions, especially those utilizing a two-speed splitter section wherein either a low-speed or a high-speed splitter ratio could be selected, utilized a fluid pressure operated differential area piston actuator wherein the smaller piston surface area is constantly pressurized to urge the actuator to cause engagement of the low-speed splitter section ratio and the actuator chamber associated with the larger area piston face is selectively pressurized or exhausted to cause engagement or disengagement of the high-speed splitter section ratio.

The splitter section control systems/methods of the prior art was not totally satisfactory as shifts were occasionally noisy due to splitter clutch raking, in cold weather conditions disengagement of the low-speed splitter clutch was difficult as the full force generated by the larger piston surface was not available and, in the event of a failure of the electricity to the solenoid controllers, the splitter section would automatically default to the low-speed ratio thereof regardless of the intention of the operator.

SUMMARY OF THE INVENTION

In accordance with the present invention, the drawbacks of the prior art are minimized or overcome by the provision of a control system/method for controlling automated splitter shifting in a fully or partially automated compound transmission which will reduce splitter clutch raking, will minimize missed shifts in cold temperatures, will provide potentially longer splitter clutch life and, upon an electrical failure of the controlling solenoid(s) will allow the splitter clutch to remain engaged in its current splitter section gear ratio.

The above is accomplished by providing individually controllable valves, preferably solenoid controlled valves, for selectively controlling the pressurization and exhausting of the actuator cylinder chambers associated with both the smaller area piston surface and the larger area piston surface of a two position differential area piston actuator. Accordingly, during a splitter shift transient, upon sensing that the actuator is in a nonengaged position, which will result from attempts to engage the splitter clutch at significantly nonsynchronous rotation, the control allows both chambers of the actuator to be exhausted until substantially synchronous rotation of the engaging clutch is sensed thus reducing raking of the splitter clutch jaw teeth. Preferably, the appropriate cylinder will be repressurized as the jaw clutch approaches synchronous to allow a rapid and smooth engagement of the splitter jaw clutch. Additionally, in cold weather conditions, a relatively higher force may be utilized to disengage the low-speed splitter jaw clutch and to engage the high-speed splitter clutch by pressurizing the actuator chamber associated with the large area piston face while retaining the other chamber vented. Further, each of the valves controlling the chambers is preferably biased to a exhausting position whereby an electrical failure of the controlling solenoids will result in the solenoid controlled valves exhausting both chambers allowing the splitter clutch to remain in its currently engaged ratio.

Accordingly, it is an object of the present invention to provide a new and improved control system/method for controlling the automated splitter shifting of a fully or partially automated compound transmission.

This and other objects and advantages of the present invention will become apparent from a reading of the detailed description of the preferred embodiment taken in connection with the attached drawings.

BRIEF DESCRIPTION OF THE DRAWINGS

FIG. 1A is a schematic illustration of a transmission for use in the system of FIG. 1 and being a compound transmission having a combined range and splitter type auxiliary section.

FIG. 2 is a schematic illustration of a prior art splitter shifting control system.

FIG. 3 is a schematic illustration of the automated splitter shift control system of the present invention.

DESCRIPTION OF THE PREFERRED EMBODIMENT

Figure 1:
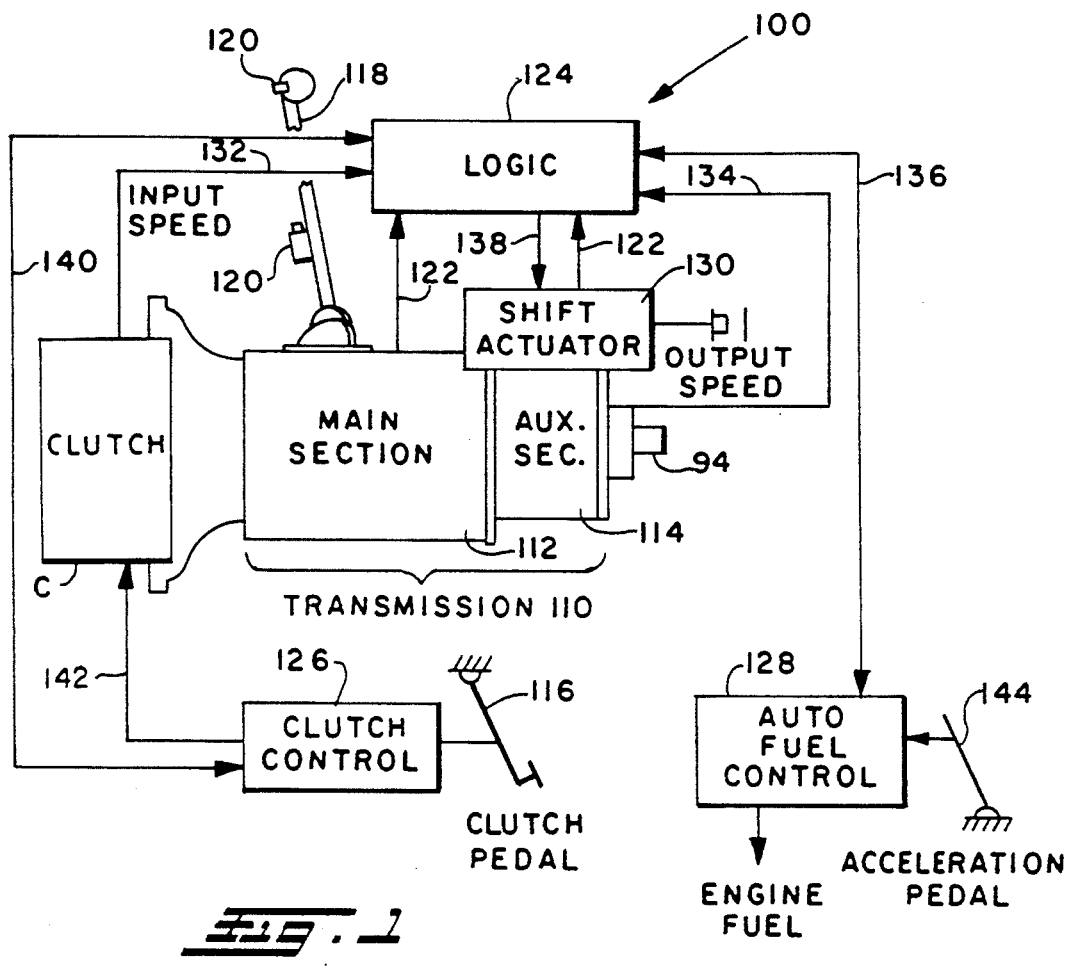
FIG. 1 is a schematic illustration of a partially automated mechanical transmission system having partially automated splitter section shifting.

Certain terminology will be used in the following description for convenience and reference only and will not be limiting. The words "upwardly", "downwardly", "rightwardly" and "leftwardly" will designate directions in the drawings to which reference is made. The words "forward", "rearward", will refer respectively to the front and rear ends of the transmission as conventionally mounted in a vehicle, being respectfully from left and right sides of the transmission as illustrated in FIG. 1. The words "inwardly", and "outwardly", refer to directions towards and away from, respectively, the geometric center of the device and designated parts thereof. The above applies to the words above specifically mentioned, derivatives thereof and words of similar import.

The term "compound transmission" is used to designate a change speed or change gear transmission having a multiple forward speed main transmission section and at least one multiple speed auxiliary transmission section connected in series whereby the selected gear reduction in the main transmission section may be compounded by further selected gear reduction in the auxiliary transmission section. "Synchronized clutch assembly" and words of similar import shall designate a positive, jaw-type clutch assembly utilized to nonrotatably couple a selected gear to a shaft by means of a positive clutch in which attempted engagement of said clutch is prevented until the members of the clutch are at substantially synchronous rotation and relatively large capacity friction means are utilized with the clutch members and are sufficient, upon initiation of a clutch engagement, to cause the clutch members and all members rotating therewith to rotate at substantially synchronous speed.

FIGS. 1 and 1A illustrate a partially automated transmission system 100 having a compound transmission 110 with a main section 112 connected in series with an auxiliary section 114 of the combined range and splitter type. In the high-speed main section and high-speed range section position (i.e. the 11th and 12th speed position), splitter shifting between 11th and 12th speeds is automated. An example of this type of transmission system may be seen by reference to U.S. Pat. No. 4,722,248, the disclosure of which is incorporated by reference.

Compound type transmission 110 comprises a main section 112 coupled to an auxiliary section 114 is controlled by the splitter shift control system and method of the invention. Main section 112 is operatively coupled to the drive shaft 20 of the vehicle engine 112 by clutch C and output shaft 94 of the auxiliary section is operatively coupled, commonly by means of a drive shaft, to the drive wheels of the vehicle (not shown).

The change gear ratios available from transmission 110 are manually selectable by first depressing clutch pedal 116 to disengage the engine drive shaft and then positioning shift lever 118 according to the shift pattern prescribed to engage the particular change gear ratio of main section desired and thence, in the event the particular gear ratio desired is contained within a different ratio of auxiliary section 114, by operation of one or more actuators such as electrical shift button or fluid actuating valves 120 to provide a signal operative to effect the engagement within auxiliary section 114 desired as is well known to those skilled in the operation of compound type transmissions.

Figure 1B:
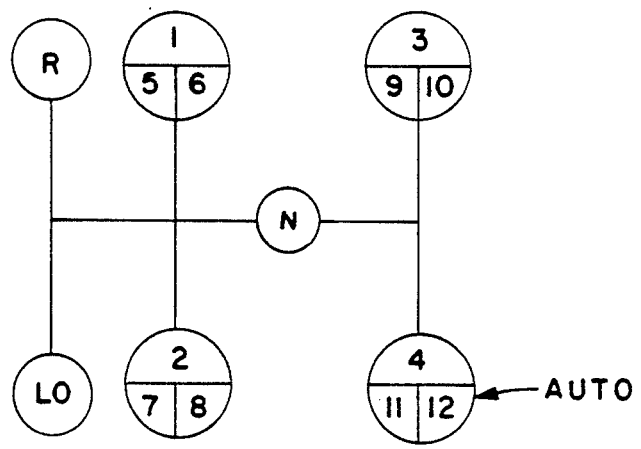
FIG. 1B is a schematic illustration of the semiautomatic shift pattern for the transmission system of FIG. 1.

For the purpose of this invention, the term "group" as used herein shall mean the particular plurality of gear ratios available from a vehicular transmission and particularly from a compound type transmission when a particular gear ratio is manually selected by an operator and the term "sequentially related" as used herein shall mean between gear ratios available within the group selected provided there is no intervening gear ratio available within another group such as, for example, shown in group "Auto" of FIG. 1B where automatic shifting is effected between gear ratios 11 and 12 but not between gear ratio 4 and 11 or 12 since other groups contain gear ratios intermediate to gear ratios 4 and gear ratios 11 and 12. Generally, the transmission is of the type having a plurality of forward gear ratios of which one group selectable by the operator is sequentially related and contains less than the total number of gear ratios provided by the transmission and automatic shifting is effected between at least two of the sequentially related gear ratios.

In the system 100, preferably, all of the gear ratios except the highest and those sequentially related to the highest in the group including the highest gear ratio, are manually selectable by the operator by actuating button 120 if required (i.e. to preselect) and then depressing clutch pedal 116 to cause clutch C to disengage transmission 112 from the engine drive member and then position shift lever 118 and thence, upon engagement of the desired change gear ratio, release pedal 116.

The shift control system is operative to initiate and enable automatic shifting between at least the sequentially related gear ratios within the highest group and preferably between all sequentially related gear ratios within each group whenever a ratio included within the group is selected by the operator.

The control system of the invention includes means for sensing and providing a suitable signals 122 to means operative to enable automatic shifting at the particular gear position desired. The means operative to enable automatic shifting includes logic circuitry 124, clutch control 126, auto fuel control 128 and shift actuator 130. Logic circuitry 124 is operative to receive and operate upon information including input speed signal 132, gear ratio position signals 122, output speed signals 134 and accelerator pedal position signal 136 to initiate and provide automatic shifting as required. Generally, automatic shifting is accomplished by shift actuator 130 including valves, actuators and the like well known to those skilled in the art according to the nature of a signal 138 received from logic circuitry 124 which, in turn, provides signal 140 to clutch control 126 which in turn provides signal 142 for automatic operation of clutch C in coordination with providing a signal 136 to automatic fuel control 128. The controller also receives a signal 136 relative to manual operation of accelerator pedal 144 in addition to information concerning the rotational speed of output shaft 94 and other shafts such as input shaft 16 and/or mainshaft 28 provided logic circuitry 124 by signals 132 and 134.

The above described means by which automatic shifting is effected is well known to those skilled in the art excepting that it becomes operable only when a gear ratio included in at least the group including the highest gear ratio is manually engaged by the operator. Examples of such automatic shifting may be appreciated in greater detail by reference to U.S. Pat. Nos. 4,361,060; 4,527,447; and 3,478,851, the disclosures of all of which are included herein by reference.

Logic circuitry 124 is preferably in the form of a microprocessor based controller, or ECU, as described in U.S. Pat. No. 4,595,986, the disclosure of which is incorporated herein by reference.

Although the present invention is described in connection with the partially automated system of FIG. 1, it is also useful in connection with more fully automated systems such as the type described in U.S. Pat. No. 4,361,060, the disclosure of which is incorporated herein by reference.

As is well known in the transmission automation art, and as disclosed in above-mentioned U.S. Pat. Nos. 4,361,060; 4,595,986 and 4,722,248, the controller 124 will preferably include predetermined logic rules, possibly stored in a ROM or EPROM portion of microprocessor memory, by which input signals will be processed to determine if shifting is required and to issue appropriate command output signals to the various system actuators. For example, as disclosed in above-mentioned U.S. Pat. Nos. 4,361,060 and 4,595,986, based upon inputs indicative of throttle position, engine speed and currently engaged gear ratio, the controller may determine if an upshift or downshift from a currently engaged ratio is required.

The structure of a compound transmission 110 having a combined range and splitter type auxiliary section 114 may be seen in FIG. 1A. Referring now to FIG. 1A, there is a schematically illustrated a well known and highly commercially successful thirteen-speed compound transmission 110. Transmission 110 comprises a main transmission section 112 connected in series with an auxiliary transmission section 114 having both range and splitter type gearing. Typically, transmission 110 is housed within a single housing and includes an input shaft 16 driven by a prime mover such as diesel engine E through a selectively disengaged, normally engaged friction master clutch C having an input or driving section 18 drivingly connected to the engine crank shaft 20 and a driven portion 22 rotatably fixed to the transmission input shaft 16.

In the main transmission section 112, the input shaft 16 carries an input gear 24 for simultaneously driving a plurality of substantially identical main section countershaft assemblies 26 and 26a at substantially identical rotational speeds. In the transmission 10 illustrated, two substantially identical main section countershaft assemblies are provided on diametrically opposite sides of a mainshaft 28, which mainshaft is generally coaxially aligned with the input shaft 16. Each of the main section countershaft assemblies 26 and 26a comprises a main section countershaft 30 supported by bearings 32 and 34 in housing H, only a portion of which is schematically illustrated. Each of the main section countershafts 30 is provided with an identical grouping of main section countershaft gears 38, 40, 42, 44, 46 and 48, fixed for rotation therewith. A plurality of main section drive or mainshaft gears 50, 52, 54, 56 and 58 surround the mainshaft 28 and are selectively clutchable, one at a time, to the mainshaft 28 for rotation therewith by sliding clutch collars 60, 62 and 64 as is well known in the art. Clutch collar 60 may also be utilized to clutch input gear 24 to mainshaft 28 to provide a direct drive relationship between input shaft 16 and mainshaft 28. Preferably, each of the main section mainshaft gears encircles the mainshaft 28 and is continuous meshing engagement with and is floatingly supported by the associated countershaft gear group, which mounting means and a special advantages resulting therefrom are explained in greater detail in U.S. Pat. Nos. 3,105,395 and 3,335,616, the disclosures of which are hereby incorporated by reference. Typically, clutch collars 60, 62 and 64 are axially positioned by means of shift forks (not illustrated) associated with a shift bar housing assembly (not illustrated) as well known in the prior art. Clutch collars 60, 62 and 64 are axially positioned by means of shift forks (not illustrated) as well known in the prior art. Clutch collars 60, 62 and 64 are of the well known nonsynchronized double acting jaw clutch type.

It is understood that although transmission 110 is illustrated as of the well known and commercially successful multiple identical countershaft, floating mainshaft and floating mainshift gear type, and while the auxiliary transmission section of the present invention is particularly well suited for such transmission structure, the advantages of the present invention are equally applicable to transmissions of the single countershaft or nonidentical multiple countershaft type.

Main section mainshaft gear 58 is the reverse gear and is in continuous meshing engagement with countershaft gears 48 by means of conventional intermediate idler gears (not shown). It should also be noted that while main transmission section 12 does provide five selectable forward speed ratios, the lowest forward speed ratio, namely, that ratio provided by drivingly connected mainshaft drive gear 56 to mainshaft 28, is often of such a high gear reduction as to be considered a low or "creeper" gear which is utilized only for starting of a vehicle under severe conditions and is usually not utilized in the high transmission range and/or may not be split in the low transmission range. Accordingly, while the main section 12 illustrated does provide five forward speeds, it is usually referred to as a "4+1" main section as only four of the forward speeds are compounded by the auxiliary transmission section 14.

Jaw clutches 60, 62 and 64 are three-position clutches in that they may be positioned in a centered, nonengaged position as illustrated or in a fully rightwardly engaged or fully leftwardly engaged position. 10 Auxiliary transmission section 114 is connected in series with main transmission section 112 and is of the three-layer, three-speed combined range/splitter type. Mainshaft 28 extends into the auxiliary section 14 and carries an auxiliary drive gear 70 fixed thereto, which auxiliary drive gear simultaneously drives a plurality of auxiliary section countershaft assemblies 72 and 72A at equal rotational speeds. Each of the auxiliary countershaft assemblies, 72 and 72A, comprises an auxiliary countershaft 74 supported by bearings 76 and 78 in housing H and carrying three auxiliary section countershaft gears 80, 82 and 84 fixed for rotation therewith. Auxiliary section countershaft gears 80 are constantly meshed with auxiliary drive gear 70 while auxiliary section countershaft gears 82 and 84, respectively, are constantly meshed with auxiliary driven gears 86 and 88, respectively. Auxiliary section driven gear 86 coaxially surrounds stub shaft 90 which is coaxial with mainshaft 28 and carries a synchronized sliding two-position synchronized clutch assembly 92 thereon. Auxiliary section driven gear 88 coaxially surrounds output shaft 94 which carries a two position slidable jaw clutch collar 96 thereon, which jaw clutch collar is substantially structurally and functionally identical to jaw clutch collars 60, 62 and 64 utilized in the main transmission section 12. Clutch assemblies 92 and 96 are both two position clutch assemblies, which may be selectively located in the rightwardmost or leftwardmost axial positions, but not normally in a centered nonengaged position therebetween. Typically, clutch assemblies 92 and 96 are axially positioned in a selected axial position by means of shift forks positioned by a remotely controlled fluid actuated piston assembly as is well known in the prior art.

Synchronized clutch assembly 92 may be removed to the leftwardmost position to drivingly couple auxiliary drive gear 70 and mainshaft 28 to auxiliary stub shaft 90 or may be selectively axially positioned in the rightwardmost position to selectively rotationally couple auxiliary driven gear 86 to auxiliary stub shaft 90. Sliding clutch collar 96 may be axially positioned in the leftwardmost position to rotationally couple stub shaft 90 to output shaft 94 or may be axially positioned in a rightwardmost position to rotationally couple auxiliary drive gear 88 to output shaft 94.

Auxiliary section countershaft gears 80 and auxiliary section drive gear 70 comprise a first gear layer, auxiliary section countershaft gears 82 and auxiliary section driven gear 86 comprise a second gear layer and auxiliary countershaft gears 84 and auxiliary section driven gear 88 comprise a third gear layer of the three gear layer auxiliary transmission section 14. As may be appreciated, when clutch collar 96 is in the rightwardmost position drivingly coupling auxiliary driven gear 88 to output shaft 94, mainshaft 28 will drive the output shaft 94 through auxiliary drive gear 70, auxiliary countershaft gear 80, auxiliary countershaft gear 84 and auxiliary drive gear 88 regardless of the position of synchronized clutch assembly 92 and thus the three-gear-layer auxiliary transmission section 14 provides a maximum of three selectable ratios.

Synchronized clutch assembly 92 is the range shift clutch utilized for making range shifts in the auxiliary section while sliding jaw clutch collar 96 is the splitter clutch utilized for making splitter shifts in the auxiliary section. A shift fork 96A is utilized to selectively axially position nonsynchronized jaw clutch collar 96. Sensors 150, 152, 154 and/or 155 may be provided for supplying input signals to controller 124 indicative of engine, input shaft, auxiliary countershaft/mainshaft and output shaft rotational speeds, respectively.

Further structural details of transmission 110 and the splitter clutch 96 may be seen by reference to U.S. Pat. Nos. 4,754,665; 4,788,889 and 4,964,313, the disclosures of which are incorporated herein by reference.

A prior art control system 160 for controlling the automated shifting of a two-speed splitter section is illustrated in FIG. 2. Axial positioning of splitter jaw clutch collar 96 is by means of shift fork or yoke 96A associated with a pneumatically operated differential area piston/cylinder actuator assembly 162.

Assembly 162 defines a cylinder housing 164 in which is sealingly and slidably received a differential area piston 166 having a first smaller surface area face 168 and an opposed second larger surface area face 170. Piston 166 divides the cylinder into a first chamber 168A associated with the first face and a second chamber 170A associated with the second face.

Pressurization of chamber 168A will develop a force urging shift fork 96A leftwardly to engage the low-speed splitter ratio while pressurization of chamber 170A will develop a force urging shift fork 96A rightwardly to engage the high-speed splitter ratio.

Conduit 172 constantly connects low-speed chamber 168A to a source of pressurized air from the air supply 174 (often an onboard compressor and/or wet tank) and the filter/regulator assembly 176. In heavy duty vehicles, the pressurized air to the transmission and other actuators is typically regulated to 60 to 80 psi.

Chamber 170A is connected to conduit 178 which fluidly connects high-speed chamber 170A to a three way two position valve 180 which is biased to connect conduit 178 to exhaust and is selectively movable to a position connecting conduit 178 to filtered and regulated source of pressurized air. Valve 180 may be selectively operated by a valve actuator 182, such as a solenoid actuated valve, in response to command output signals from the controller 124.

In operation, first chamber 168A is constantly pressurized and urges the low-speed splitter jaw clutch into engagement with a first force. To engage the high-speed splitter clutch, valve 180 is caused to assume its pressurizing or second position to pressurize the second chamber, high-speed chamber 170A, and the high-speed splitter jaw clutch will be urged into engagement with a force equal to the product of the pressurization of the regulated air times the difference in area between the second (170) and first (168) piston faces.

In a particular example, the surface area of first face 168 is about 1.11 square inches ($A_1 = 1.11$ in$^2$), the surface area of second face 170 is about 2.46 square inches ($A_2 = 2.46$ in$^2$) and the regulated pressure is 60 psi ($P_s = 60$ psi). Accordingly, the force generated by pressurizing the first face is about 66.4 lbs to the left, the force generated by pressurizing the second face is about 147.7 lbs to the right and the force generated by pressurizing both faces is about 81.3 lbs. to the right. Thus, when valve 180 is in the normal or exhausting position, the splitter sleeve 96 is urged into engagement with the low-speed splitter ratio (direct in FIG. 1A) with about 66.4 lbs. of force, and when valve 180 is in the pressurizing position, splitter clutch sleeve 96 is urged rightwardly into engagement of the high-speed splitter ratio (overdrive in FIG. 1A) with about 81.3 lbs. of force.

The prior art control system of FIG. 2 is generally effective, however, in certain circumstances, improvement is desirable. As chamber 168A is constantly pressurized, the clutch sleeve 96 is constantly urged either leftwardly of rightwardly and thus, even if substantial nonsynchronous conditions at the engaging jaw clutch teeth is sensed, the clutch teeth will be urged into raking engagement causing possibly objectionable noisy splitter shift and/or wear of the clutch teeth. Also, after clutch engagement a constant force is continuously applied to clutch sleeve which may result in wear and/or stress to the shifting elements. Further, in the case of an electrical failure to valve actuator 182, the splitter section will default to the low-speed position thereof which may be contrary to the vehicle operator's wishes.

Additionally, as chamber 168A is constantly pressurized, the full available force (about 147.7 lbs.) provided by pressurizing chamber 170A is not available for high force disengagement of the low-speed ratio and/or engagement of the high-speed splitter ratio as may be desirable under certain conditions such as cold weather operation of system 100.

The control system 200 of the present invention for automatic shifting a two-speed splitter section is illustrated in FIG. 3. As with the prior art system 160, a two-position, differential area piston actuator 162 is utilized to position the splitter clutch 96, and pressurized air is provided by the supply 174 and filter/regulator 176.

The system controller, ECU 124, operates on various inputs from the fuel controller, an actuator position sensor 201 and the speed sensors to issue command output signals to the fuel controller and two control valves, 202 and 204.

Fuel control 128 is preferably of the type disclosed in above-mentioned U.S. Pat. No. 4,361,060, which ordinarily will fuel the engine under operator control as indicated by the operator's manual positioning of the pedal 144 but which may, upon receipt of appropriate command signals 136 from controller 124, fuel the engine as commanded by the control logic, regardless of the positioning of pedal 144. When automatically controlled fueling of the engine is no longer required, the fuel control 128 will again supply fuel to the engine as determined by pedal position, thus returning fuel control to the operator.

As is well known, and as is disclosed in above-mentioned U.S. Pat. No. 4,361,060, by sensing the rotational speed of output shaft 94 and the rotational speed of shaft 92 or of gear 88, as determined by the speed sensors 150, 152, 154 and 155 and the position sensors in the shift actuator 130 and the clutch controller, the substantially synchronous or assynchronous condition of splitter clutch 96 may be determined. Of course, if range clutch 92 and mainsection 112 are engaged in known ratios, and if clutch C is fully engaged, for a given vehicle speed (output shaft speed), a required engine speed ("target engine speed") for substantially synchronous engagement of the splitter clutch may be determined.

Valves 202 and 204 are each two-position, three-way valves for connecting a controlled port, 202A and 204A respectively, to either the source of regulated air or to exhaust. Valves 202 and 204 are independently operable with valve 202 controlling the pressurization or exhaust of actuator chamber 168A and valve 204 controlling the pressurization or exhaust of actuator chamber 170A. Preferably, as illustrated in FIG. 3, valves 202 and 204 are solenoid controlled valves biased to the exhausting positions thereof. As the valves are independently operable, each of the two actuator chambers 168A and 170A are independently and individually pressurized or exhausted and, in the event of an electrical power failure, neither of the chambers will be pressurized which might cause the actuator to assume a possibly undesirable default position thereof.

The operation of system 200 is as described below.

For an upshift sequence, the shift sequence starts when the controller 124 had determined that a shift point has been reached. Shift point selection is based upon multiple inputs to the controller arid may be based upon logic such as is utilized in above-mentioned U.S. Pat. No. 4,361,060. As this is an upshift, both the low 202 and the high 204 speed solenoid control valves are energized. As a result of the differential area piston, this provides a net force on the splitter clutch towards the high-speed splitter ratio position. At the same time, the fuel controller is caused to decrease fueling of the engine causing a torque break. When a torque break occurs, the splitter clutch 96 will succumb to the net force in the high-speed ratio direction which will disengage the splitter clutch from the low-speed ratio. Since the splitter clutch is driven by a two position piston/cylinder actuator 162, the splitter clutch is driven across neutral, towards engagement with the high-speed jaw clutch. However, as there is usually such a high initial differential speed between the engaging jaw clutch members, the sliding splitter clutch member is rejected by the clutch member rotating with the high-speed ratio gear and very little raking of the jaw clutch teeth occurs. As the system detects that the splitter clutch has gone to the neutral position by means of position sensor 201, both solenoid valves 202 and 204 are turned off to reduce the force of a splitter clutch to zero. The splitter clutch now "floats" in the neutral region, waiting for synchronous speed to be achieved.

Simultaneously, as soon as splitter neutral is detected, the automatic fuel control is operated in a synchronizing mode to cause the engine speed to be brought to synchronous with the desired gear, preferably via a closed loop control. As the engine speed is approaching synchronous, based upon the rate of approaching synchronous and the clutch actuator reaction time, the high-speed ratio solenoid valve 204 is energized by itself to supply full force for engagement of the splitter clutch into the high-speed ratio position. This helps assure that full jaw clutch engagement is obtained. Once the system has determined that the splitter has fully engaged, fueling of the engine is returned to operator control. Preferably, the high-speed solenoid control valve 204 remains energized for a sufficient amount of time (about 2 seconds) to assure continued engagement of the high-speed ratio jaw clutch. The solenoids are then deenergized to increase the reliability of the solenoids and drive circuitry.

The downshift operational sequence of control system 200 is similar to the upshift sequence described above except that only the low-speed solenoid control valve 202 is energized to drive the splitter clutch into neutral and then into the low-speed splitter operational position. It is important to note that the disengagement force required on the downshift is much less due to the lower torque-lock effect holding the gears engaged. Therefore, the pneumatic actuator piston/cylinder is designed to have the lower force when shifting from high speed to low speed (i.e. downshifting) and the higher force when shifting from low speed to high speed (i.e. upshifting).

The above system also allows for a full force splitter shifting control algorithm which is most useful during a shift into the high-speed splitter ratio in cold temperatures (less than 30 degress Fahrenheit) when the splitter clutch resistance to disengagement of the low-speed ratio is extremely high. By independently controlling the high-speed ratio cylinder 204, the full force of pressurized fluid acting on piston face 170 may be utilized to disengage the splitter clutch from the low-speed position thereof.

Briefly, during an upshift when both solenoid control valves have been actuated, if, for a given period of time (about 1.0 to 2.0 seconds) after decreasing fuel, a disengagement of the low-speed splitter ratio is not sensed, the low-speed solenoid 202 is deenergized while the high-speed solenoid 204 remains energized thus applying maximum force for disengagement of the low-speed ratio. At the same time, the fuel controller is caused to increase then decrease the fueling of the engine to create another torque break across the splitter section. During a downshift, although the force applied to the splitter clutch cannot be increased, if disengagement of the high-speed ratio is not sensed within a predetermined period of time, (usually about one to two seconds) the engine fuel controller is again cause to momentarily increase and then again decrease the fueling of the engine to create a torque break across the engaged splitter jaw clutches.

Upon sensing completion of a desired shift for a predetermined period of time, as indicated above, all solenoids are deenergized to increase the life and reliability of the solenoids, the actuators and the drivers. To assure continued engagement, the appropriate solenoid may be periodically energized (every 20–60 seconds) for a short period of time (1.0 to 2.0 seconds) to assure complete and continued engagement of the desired splitter speed jaw clutch.

As indicated previously, as both of the solenoid controlled valves 202 and 204 are biased to the exhaust positions thereof, an electrical failure will simply cause the valves to move to, or remain in, the exhausting position thereof and thus allow the splitter clutch to remain in its as is position.

Although this invention has been described in its preferred form with a certain degree of particularity, it is understood that the present disclosure of the preferred embodiment has been made only by way of example, and that numerous changes in the detailed construction and combination and arrangement of the parts may be resorted to without departing from the spirit and the scope of the invention, as hereinafter claimed.

We claim:

1. A method for controlling an automated vehicular transmission (100) system comprising a compound transmission (110) comprising a main transmission section (112) connected in series with an auxiliary transmission section (114) having a high-speed auxiliary section ratio and a low-speed auxiliary section ratio, nonsynchronized jaw clutch means (96) for engaging one of said auxiliary section ratios, a two-position fluid actuated actuator (162) for shifting the auxiliary section to a selected one of the high-speed and low-speed ratios thereof, said actuator comprising a differential area piston (166) with a first piston face (170) for generating a force to urge engagement of said high-speed ratio and a second piston face (168) smaller than and opposed to said first face for generating a force to urge engagement of said low-speed ratio, a position sensor (201) for sensing said actuator is in either the high-speed ratio engaged position, the low-speed ratio engaging position or an intermediate position and for generating position signals indicative thereof, a fuel controlled engine (E) drivingly connected to said transmission, a manually positioned fuel throttle device (144) by which an operator requests a desired amount of fuel to be supplied to the engine, a fuel controller (128) for controlling the amount of fuel supplied to said engine, a first two-position control valve (204) having a pressurizing position for selectively pressurizing and an exhausting position for selectively exhausting said first piston face, a second two-position control valve (202) having a pressurizing position for selectively pressurizing and an exhausting position for selectively exhausting said second piston face, said control valves individually operable, rotational speed sensing means (150, 152, 154, 155) for sensing substantially synchronous or not substantially synchronous conditions at said jaw clutches and for providing speed signals indicative thereof, a control unit for receiving input signals including signals from said position sensor and rotational speed sensors and for processing same according to predetermined logic rules to generate command output signals to said fuel controller and said first and seconds valves, said method comprising the steps of:

(i) upon sensing a selection of a shift from said low-speed to said high-speed auxiliary section ratio, causing both said first and said second valve to assume the pressurizing positions thereof, monitoring the position of said actuator and causing said fuel controller to supply a reduced amount of fuel to said engine, then (a) if the actuator is sensed as moving to the high-speed ratio engagement position, fueling the engine in accordance with operator positioning of said fuel throttle device and retaining at least the first valve in the pressurizing position for a predetermined time, then causing both valves to assume the exhausting position thereof, or (b) if the actuator is sensed as moving to and remaining in the intermediate position, causing both valves to move to the exhausting position thereof, causing the fuel control to fuel the engine to rotate at a target synchronous rotation until substantial synchronous rotation of the high-speed ratio jaw clutch is sensed, causing at least the first valve to assume the pressurizing position, then when the actuator is sensed as moving to the high-speed ratio engaging position thereof, fueling the engine in accordance with operator positioning of said fuel throttle device and retaining at least the first valve in the pressurized position for a predetermined time, then causing both valves to assume the exhausting positions thereof.

2. The method of claim 1 additionally comprising, after completion of the steps of (i)(a) and (i)(b) above, periodically causing the first valve to be moved from the exhausting position to the pressurizing position and then back to the exhausting position while maintaining the second valve in the exhausting position.

3. The method of claim 2 additionally comprising;
   (c) if the actuator is sensed as remaining in the low-speed ratio position for a first period of time, retaining the first valve in the pressurizing position while causing the second valve to assume the exhausting position thereof and momentarily causing an increase and a decrease in the amount of fuel supplied to the engine.

4. The method of claims 1, 2 or 3 when said auxiliary transmission section is a splitter type auxiliary transmission section.

5. The method of claim 1 wherein said control system is pneumatically operated.

6. The method of claim 4 wherein said control valves are solenoid controlled valves.

7. The method of claim 6 wherein said solenoid controlled valves are normally biased to the exhausting positions thereof.

8. The method of claim 4 wherein said control unit is a microprocessor based control unit.

9. The method of claim 2 wherein said periodically causing the first valve to be moved from the exhausting position to the pressurizing position occurs about every 10 to 60 seconds and said first valve is contained in the pressurizing position for about one to two seconds.

10. The method of claim 3 wherein said predetermined period of time is about one second.

11. The method of claim 10 when said auxiliary transmission section is a splitter type auxiliary transmission section.

12. A system (200) for controlling an automated vehicular transmission system (100) comprising a compound transmission (110) comprising a main transmission section (112) connected in series with an auxiliary transmission section (114) having a high-speed auxiliary section ratio and a low-speed auxiliary section ratio, nonsynchronized jaw clutch means (96) for engaging one of said auxiliary section ratios, a two-position fluid actuated actuator (162) for shifting the auxiliary section to a selected one of the high-speed and low-speed ratios thereof, said actuator comprising a differential area piston (166) with a first piston face (170) for generating a force to urge engagement of said high-speed and a second piston face (168) smaller than and opposed to said first face for generating a force to urge engagement of said low-speed ratio, a position sensor (201) for sensing said actuator is in either the high-speed ratio engaged position, the low-speed ratio engaging position or an intermediate position and for generating position signals indicative thereof, a fuel controlled engine (E) drivingly connected to said transmission, a manually positioned fuel throttle device (144) by which an operator requests a desired amount of fuel to be supplied to the engine, a fuel controller (128) for controlling the amount of fuel supplied to said engine, a first two-position control valve (204) having a pressurizing position for selectively pressurizing and an exhausting position for selectively exhausting said first piston face, a second two-position control valve (202) having a pressurizing position for selectively pressurizing and an exhausting position for selectively exhausting said second piston face, said control valves individually operable, rotational speed sensing means (150, 152, 154, 155) for sensing substantially synchronous or not substantially synchronous conditions at said jaw clutches and for providing speed signals indicative thereof, a control unit (124) for receiving input signals including signals from said position sensor and rotational speed sensors and for processing same according to predetermined logic rules to generate command output signals to said fuel controller and said first and seconds valves, said system comprising:
   means (124) effective upon sensing a selection of a shift from said low-speed to said high-speed ratio for causing both said first and said second valve to assume the pressurizing positions thereof, for monitoring the position of said actuator and for causing said fuel controller to supply a reduced amount of fuel to said engine, then
   (a) if the actuator is sensed as moving to the high-speed ratio engagement position, for fueling the engine in accordance with operator positioning of said fuel throttle device and for retaining at least the first valve in the pressurizing position for a predetermined time, then for causing both valves to assume the exhausting position thereof, or
   (b) if the actuator is sensed as moving to and remaining in the intermediate position, causing both valves to move to the exhausting position thereof, for causing the fuel control to fuel the engine to rotate at a target synchronous rotation until substantial synchronous rotation of the high-speed ratio jaw clutch is sensed, for causing at least the first valve to assume the pressurizing position, then when the actuator is sensed as moving to the high-speed ratio engaging position thereof, for fueling the engine in accordance with operator positioning of said fuel throttle device and for retaining at least the first valve in the pressurized position for a predetermined time, then for causing both valves to assume the exhausting positions thereof.

13. The system of claim 12 additionally comprising, means effective after completion of the steps of (i)(a) and (i)(b) above, for periodically causing the first valve to be moved from the exhausting position to the pressurizing position and then back to the exhausting position while maintaining the second valve in the exhausting position.

14. The system of claim 13 additionally comprising;
   (c) means effective if the actuator is sensed as remaining in the low-speed ratio position for a first period of time, for retaining the first valve in the pressurizing position while causing the second valve to assume the exhausting position thereof and for momentarily causing an increase and a decrease in the amount of fuel supplied to the engine.

15. The system of claims 12, 13 or 14 wherein said auxiliary transmission section is a splitter type auxiliary transmission section.

16. The system of claim 12 wherein said control system is pneumatically operated.

17. The system of claim 15 wherein said control valves are solenoid controlled valves.

18. The system of claim 17 wherein said solenoid controlled valves are normally biased to the exhausting positions thereof.

19. The system of claim 15 wherein said control unit is a microprocessor based control unit.

20. The system of claim 14 wherein said predetermined period of time is about one second.

* * * * *